(12) United States Patent
Cheong et al.

(10) Patent No.: US 6,724,975 B1
(45) Date of Patent: Apr. 20, 2004

(54) PRODUCTS COMBINING TELEVISION AND VIDEO RECORDER

(75) Inventors: Raymond Cheong, Singapore (SG); Win Lwin, Singapore (SG)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/460,561

(22) Filed: Dec. 14, 1999

(51) Int. Cl.⁷ .................................................. H04N 5/91
(52) U.S. Cl. ........................................ 386/46; 348/634
(58) Field of Search ................... 386/1, 9, 46; 348/634, 348/635, 556, 569, 689, 678

(56) References Cited

U.S. PATENT DOCUMENTS

| | | | | |
|---|---|---|---|---|
| 5,410,363 A | * | 4/1995 | Capen et al. | 348/678 |
| 5,808,699 A | * | 9/1998 | Tsujihara et al. | 348/689 |
| 6,195,079 B1 | * | 2/2001 | Reddy | 348/569 |
| 6,529,245 B2 | * | 3/2003 | Watanabe et al. | 348/556 |

* cited by examiner

*Primary Examiner*—Thai Tran
*Assistant Examiner*—Christopher Onuaku
(74) *Attorney, Agent, or Firm*—Joseph S. Tripoli; Paul P. Kiel

(57) ABSTRACT

Combos comprising a display and a video recorder, which avoid a very bright image when switching from a standby recording mode to an on mode. In order to reduce cost, some combos include only one video circuit which is used by both the television and the video recorder, and which notably controls the level of its output signals directed to the display. This control is realized using a feedback loop that provides a feedback signal from the display. To avoid displaying a very bright image when switching the combo from a standby recording mode to an on mode, an amplification control circuit progressively revives an amplifier of the display.

9 Claims, 1 Drawing Sheet

PRODUCTS COMBINING TELEVISION AND VIDEO RECORDER

FIELD OF THE INVENTION

The invention relates to an improvement in products combining television and video recorder.

BACKGROUND OF THE INVENTION

Combos are products comprising a display, e.g. a cathode ray tube (CRT) and a video recorder, e.g. a video tape recorder (VTR). A video recorder should be understood as any device capable of recording video signals on an appropriate storage medium, e.g. magnetic tape, optical disk, magneto-optical disk, magnetic hard disk. In order to reduce their cost, some combos are fit with only one video circuit which is used by both the television and the video recorder.

In some combos, the video circuit controls the level of its output signals directed to the display thanks to a feedback loop using a feedback signal from the display. An example of such a construction is given in German patent application No. 33 37 106. Such video circuits are said to have an auto-cutoff function.

Combos conventionally function according to three possible operating modes: an "on" mode wherein both the display and the video recorder are switched on, a mode called "standby recording" wherein the display is switched off and the video recorder is switched on and an "off" mode in which both the display and the video recorder are switched off.

In conventional combos with a single video circuit and the auto-cutoff function, a very bright image is displayed when switching the combo from the standby recording mode to the on mode.

SUMMARY OF THE INVENTION

The invention seeks to avoid displaying such a bright image which is uncomfortable to the user by simple and cheap means.

An apparatus according to the invention comprises a source of video signal, a video circuit connected to the source and generating at least a first signal and a second signal, a video recorder for recording the second signal on a medium and a display comprising an amplifier for the first signal and displaying images coded in the first signal.

The video circuit includes calibration means for adjustment of the first signal depending on a feedback signal from the display.

A control signal is generated when the video recorder is functioning and when the display is switched on and an amplification control circuit progressively revives the amplifier after the control signal is generated.

According to other features of the invention, the amplification control circuit generates a biasing voltage of the amplifier. The amplification control circuit includes a RC-circuit able to continuously vary the biasing voltage between a first voltage and a second voltage during a period of time, which is preferably longer than 1 s.

The calibration means includes a feedback loop comprising a multiplier and a black level clamp which calibrate the first signal depending on the feedback signal. Practically, the first signal is a set of three signals in R,G,B form.

The control signal is generated by a controller connected to the amplification control circuit, more specifically upon receipt of a signal from a remote-control or from a keyboard. The control signal is representative of a mode of the apparatus.

The invention is thus about a video apparatus comprising a display comprising an amplifier having an input, a controller having an output generating a signal representative of a mode of the apparatus, and an amplification control circuit connected to said output and being able to generate on said input a voltage continuously varying between a first voltage and a second voltage during a period of time.

The progressive revival of the amplifier allows the feedback loop of the calibration circuit to adjust during the period of time and the video circuit to output calibrated signals when full amplification is realized by the amplifier.

The first images which are displayed after switching to the on-mode are thus slightly amplified and, when the amplification has reached a normal value, the feedback loop is fully efficient and the brightness of the image is conveniently regulated.

Hence no very bright image will appear when the combo is switched from the standby recording mode to the on mode.

DETAILED DESCRIPTION OF THE DRAWING

Figure 1:
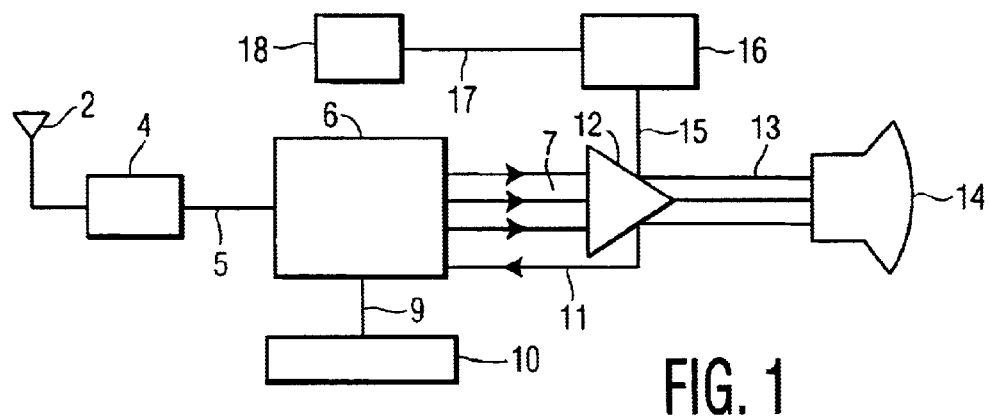
FIG. 1 is a schematic diagram representing the main elements of a combo according to the invention.

A combo as represented on FIG. 1 receives a video signal from a remote emitter on an antenna 2 and through a tuner 4. The association of the antenna 2 and the tuner 4 realizes a source of composite video signal 5. The video signal 5 is then processed through a video circuit 6. The video circuit 6 translates the composite video signal 5 into three calibrated signals (jointly defining a first signal) 7 in R,G,B format for use in a cathode ray tube (CRT) 14. The video circuit 6 also outputs a second signal 9 which is used by a video tape recorder (VTR) 10.

The R,G,B signals 7 are amplified by an amplification stage generally referenced as 12. The amplified R,G,B signals 13 are then directed to the cathodes of the CRT 14.

Figure 2:
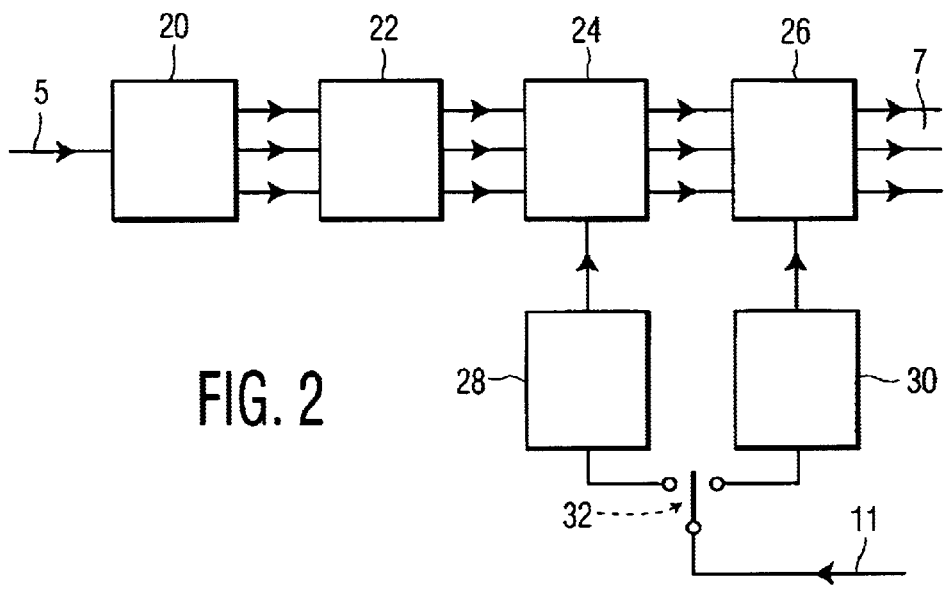
FIG. 2 represents the main elements of the calibration circuit of the combo.

The calibration of R,G,B signals by the video circuit 6 will now be explained with more details in reference to FIG. 2.

The composite video signal 5 is first converted into a R,G,B signal by a conventional converter 20 and fed to a processing circuit 22. The processing circuit 22 allows signal processing like contrast and brightness control by the user. The R,G,B signal is then processed by a multiplier 24 and a black level clamp 26.

The multiplier 24 and the black level clamp 26 are part of the calibration circuit. The calibration is based on a feedback signal 11 from the amplification stage 12 representative of the sum of the currents sent to the 3 cathodes. As conventional, the signal for each cathode is calibrated during a first standardized time interval (during vertical blanking) as regards its amplitude and during a second standardized time interval as regards its level. A switch 32 accordingly switches the feedback signal to a first sensor 28 for drive current measurement during the first time intervals and to a second sensor 30 for black current measurement during the second time intervals.

For each of the 3 R,G,B signals, a gain value is stored in the multiplier 24 according to the output of the first sensor 28 and an offset value is stored in the black level clamp 26 according to the output of the second sensor 30. The calibration thus takes place every raster: the R,G,B signals are very frequently calibrated (every 17 ms on a 60 Hz basis).

The amplification stage 12 receives a biasing voltage 15 from an amplification control circuit 16. If the biasing voltage 15 is set at a high level (first voltage: 2.7 V), the amplification stage 12 does not function: this means that no signal is sent to the cathodes. If the biasing voltage 15 is set at a low level (second voltage: 0.7 V), the amplification stage 12 amplifies the R,G,B calibrated signals 7 into amplified R,G,B signals 13 for the cathodes.

Figure 3:
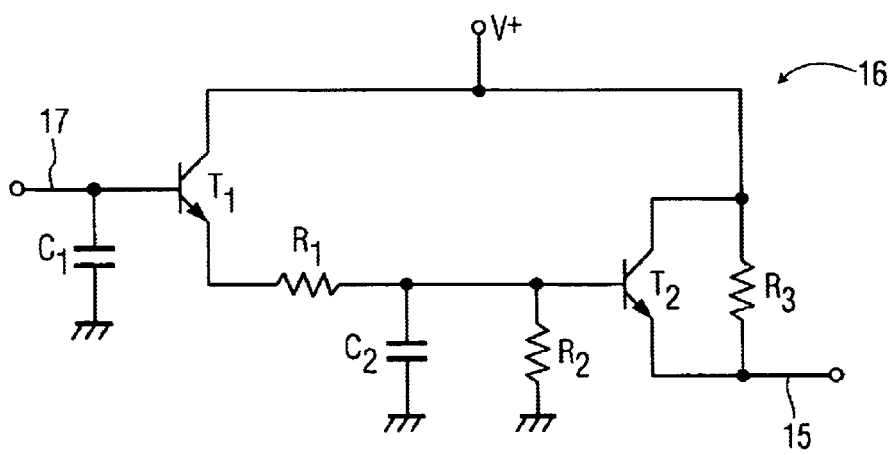
FIG. 3 is an embodiment of the amplification control circuit of the combo.

The amplification control circuit 16 will now be described with more details in reference to FIG. 3.

An input 17 of the amplification control circuit 16 is connected to the base of a first transistor T1 and to the ground via a first capacitor C1. The collector of the first transistor T1 is connected to a reference voltage V+ and the emitter of the first transistor T1 is connected to the base of second transistor T2 through a first resistor R1. The base of the second transistor T2 is also connected to the ground via a second capacitor C2 and a second resistor R2 in parallel to each other.

The collector of the second transistor T2 is connected to the reference voltage V+ and the emitter of the second transistor T2 is connected to an output 15 of the amplification control circuit 16. A third resistor R3 is connected between the emitter and the collector of the second transistor T2.

The input 17 is connected to a controller 18 of the combo (for instance a micro-processor) and the output 15 delivers the biasing voltage to the amplification stage 12.

The controller 18 deals with the various functions of the combo. Upon receipt of signals from the keyboard or from the remote control, it will send instructions to switch on or off the various parts of the combo by sending signals representative of the mode to the power supply of the combo. For instance, the controller outputs a control signal SR representative of the standby recording mode. When the combo is in the on-mode or in the off-mode, the control signal SR from the controller 18 is at a low level (0 V); when the combo is in the standby-recording mode, the control signal SR is at a high level (5V).

The control signal SR is notably fed to the amplification control circuit 16 at its input 17.

The way the amplification control circuit 16 works when the combo is switched from standby-recording to on will be described below with the following values: V+=8.5 V; C1=5,6 nF; R1=10 kΩ; C2=47 μF; R2=220 kΩ; R3=24 kΩ. The voltages are expressed relatively to the ground potential.

When in standby-recording, the control signal SR from the controller is fed to the amplification control circuit 16 at a high level (5 V). The first transistor T1 is thus on, leading to a voltage of 3.5 V on its emitter. The base of T2 is consequently at a voltage of about 3.3 V. Hence T2 is on and its emitter voltage is 2.7 V.

The amplification stage 12 is thus not working in standby-recording, and consequently the feedback signal 11 used in the video circuit 6 for calibration is null or has no meaning. The calibration is not realized properly in the standby-recording mode.

When the user switches the combo to the on-mode, the controller 18 puts the control signal SR on pin 17 at a low level, that is 0 V. The transistor T1 is quite immediately off (the delay from C1 is negligible). However, due to the slow discharge of C2, the voltage at the base of T2 falls progressively and T2 remains on for about 10 s. Consequently, the voltage at the emitter of T2 will fall down progressively during a period of time of about 10 s from 2.7V to 0.7 V (which is the voltage when T2 switches off) and will thereafter remain at 0.7 V.

The amplification stage is consequently revived progressively which allows the feedback loop of the calibration circuit to adjust during the above mentioned period of time and the video circuit 6 to output calibrated signals when full amplification is realized by the amplification stage 12.

The first images which are displayed on the CRT 14 after switching to the on-mode are thus slightly amplified and when the amplification has reached a normal value the feedback loop is fully efficient and the brightness of the image is conveniently regulated.

The invention is not limited to the above-described embodiment.

For instance, another source of video signal can be used, like a video disk player or a decoder for satellite broadcast reception. An optic video recorder can also be used, like for instance a DVD-recorder.

What is claimed is:

1. An apparatus comprising:

a source of video signal;

a video circuit connected to the source and generating at least a first signal and a second signal;

a video recorder for recording the second signal on a medium;

a display comprising an amplifier for the first signal and displaying images coded in the first signal;

wherein a control signal is generated when the video recorder is functioning and when the display is switched on, wherein the video circuit includes calibration means for adjustment of the first signal depending on a feedback signal from the display, wherein an amplification control circuit it progressively revives the amplifier after the control signal is generated.

2. An apparatus according to claim 1, wherein the amplification control circuit generates a biasing voltage of the amplifier.

3. An apparatus according to claim 2, wherein the amplification control circuit includes a RC-circuit able to continuously vary the biasing voltage between a first voltage and a second voltage during a period of time.

4. An apparatus according to claim 3, wherein the period of time is longer than 1 s.

5. An apparatus according to claim 1, wherein the calibration means includes a feedback loop comprising a multiplier and a black level clamp which calibrate the first signal depending on the feedback signal.

6. An apparatus according to claim 1, wherein the control signal is generated by a controller connected to the amplification control circuit.

7. An apparatus according to claim 6, wherein the control signal is generated by the controller upon receipt of a signal from a remote-control or from a keyboard.

8. An apparatus according to claim 1, wherein the control signal is representative of a mode of the apparatus.

9. An apparatus according to claim 1, wherein the first signal is a set of three signals in R,G,B form.

\* \* \* \* \*